United States Patent Office 3,071,451
Patented Jan. 1, 1963

3,071,451
ORGANIC SUBSTANCES STABILIZED WITH A METAL DEACTIVATOR
Louis Schmerling, Riverside, Ill., assignor, by mesne assignments, to Universal Oil Products Company, Des Plaines, Ill., a corporation of Delaware
No Drawing. Filed Nov. 4, 1957, Ser. No. 694,071
7 Claims. (Cl. 44—73)

This invention relates to a novel metal deactivator and to the use thereof in the stabilization of organic substances against deterioration by oxygen catalyzed in the presence of, or by contact with, certain metallic oxidation promotors.

The novel metal deactivator of the present invention is employed to deactivate the catalytic effect of metals in any substrate containing such metals. Thus, the metal deactivator composition is used to prevent such deterioration of motor fuels, fats, edible oils, lubricating oils, diesel oils, fuel oils, etc. The present invention is particularly applicable to the stabilization of olefin containing motor fuels such as cracked and/or polymer gasoline, or mixtures of these with straight run, natural and/or other saturated gasolines.

One method of refining gasoline is the copper sweetening process, in which process the gasoline is treated with a copper-containing reagent. As a result of this treatment, the sweetened gasoline usually contains relatively small amounts of copper compounds which catalyze oxidation reactions. In addition, gasolines come in contact with various metals in the course of refining, storing and shipping operations, and the metals may catalyze the oxidation reactions. In some cases, this also may result in the gasoline containing minor amounts of such metals as copper, iron, cobalt, nickel, chromium, lead, etc., which have a detrimental effect on the stability of the gasoline. In addition to gasoline, the other organic compounds hereinbefore set forth also become contaminated with metallic constituents during the course of refining, storing and shipping operations and, accordingly, are deleteriously affected by the metallic constituents.

One important objection to the metal deactivators presently in use is that the active constituent precipitates out of solution at the low temperatures normally encountered in winter months. This is a serious drawback to the satisfactory use of these metal deactivators because solidification in the drum or other container necessitates heating and additional handling in order that the metal deactivator may be pumped for incorporating into the substrate. Also, precipitation of the active constituent out of solution in the substrate means that the metal deactivator is not functioning for the desired purpose and also interferes with pumping of the substrate due to plugging of the lines, pumps, etc.

The present invention provides a novel metal deactivator which will remain in solution at considerably lower temperatures and will not cause the difficulties mentioned above during use at the low temperatures encountered in the winter months. The novel metal deactivator also possesses high potency in preventing oxidation caused by metallic constituents in the substrate and also possesses greater solubility in organic substrates.

In one embodiment the present invention relates to a method of stabilizing an organic substance against oxidation catalyzed by a metal constituent, which comprises incorporating in said organic substance a metal deactivator comprising an N,N'-di-(3-alkenylsalicylidene)-diaminoalkane.

In a specific embodiment the present invention relates to a method of stabilizing gasoline against oxidation catalyzed by a metal constituent, which comprises incorporating in said gasoline N,N'-di-(3-allylsalicylidene)-1,2-diaminopropane.

In another embodiment the present invention relates to an organic substance containing a metal which normally catalyzes oxidative deterioration and additionally containing the metal deactivator as herein defined.

The metal deactivators of the present invention are new compounds and, accordingly, are being so claimed in the present application.

The novel metal deactivator of the present invention comprises an N,N'-di-(3-alkenylsalicylidene)-diaminoalkane. A particularly preferred metal deactivator comprises N,N'-di-(3-allylsalicylidene)-1,2 - diaminopropane which is prepared by the condensation of 2 moles of allylsalicylaldehyde with 1 mole of 1,2-diaminopropane. Other metal deactivators include N,N'-di-(3-methallylsalicylidene)-1,2-diaminopropane, N,N'-di-(3-crotylsalicylidene) - 1,2-diaminopropane, N,N'-di-[3-(2-pentenyl)salicylidene]-1,2 - diaminopropane, N,N'-di - [3-(2-hexenyl)salicylidene]-1,2 - diaminopropane, N,N'-di-[3-(2-heptenyl)salicylidene]-1,2-diaminopropane, N,N'-di - [3 - (3-methyl-2-butenyl)salicylidene]1,2-diaminopropane, etc.

While 1,2-diaminopropane preferably is used for condensation with the allylsalicylaldehyde compound in preparing the metal deactivator, other suitable diaminoalkanes may be employed. Illustrative diaminoalkanes include 1,2-diaminoethane, 1,3-diaminopropane, 1,2-diaminobutane, 1,3-diaminobutane, 1,4-diaminobutane, 1,2-diaminopentane, 1,3-diaminopentane, 1,4-diaminopentane, 1,2-diaminohexane, 1,3-diaminohexane, 1,4-diaminohexane, etc. When using these diaminoalkanes the metal deactivator compound will be similar to the specific compounds hereinbefore set forth except for the diaminoalkane grouping. For example, when condensing 1,2-diaminoethane with 3-allylsalicylaldehyde, the metal deactivator will be N,N'-di-(3-allylsalicylidene)-1,2-diaminoethane. Similarly when condensing 1,2- diaminobutane with 3-allylsalicylaldehyde, the metal deactivator will be N,N$_2$-di-(3-allylsalicylidene)-1,2-diaminobutane, etc.

While it is preferred that allylsalicylaldehyde or other salicylaldehyde compounds having a side chain containing an allyl group be used in preparing the metal deactivator, in another embodiment the unsaturation may be in the alpha or other position other than allyl (i.e., beta). Illustrative compounds having an alpha unsaturation include N,N'-di-(3-vinylsalicylidene)-1,2-diaminopropane, N,N'-di-(3-isocrotylsalicylidene)-1,2-diaminopropane, etc. Illustrative compounds having the unsaturation in a different position include N,N'-di-[3-(3-butenyl)salicylidene]-1,2-diaminopropane, N,N' - di - [3 - (3-pentenyl)salicylidene]-1,2-diaminopropane, N,N'-di-[3-(4 - pentenyl)salicylidene]-1,2-diaminopropane, etc.

It will be noted that a number of different metal deactivator compounds may be prepared and used in accordance with the present invention. It is understood that all these compounds are not necessarily equivalent in the same or different substrates, but all of them are effective metal deactivators and will remain in liquid condition at low temperatures. The metal deactivator of the present invention contains an unsaturation in the side chain attached to the salicylal ring, and it is believed that this unsaturation in association with the remaining constituents of the metal deactivator produces the improved results.

The metal deactivator may be prepared in any suitable manner. As hereinbefore set forth, a preferred deactivator is prepared by the condensation of 2 moles of allylsalicylaldehyde with 1 mole of 1,2-diaminopropane. The condensation is effected readily by refluxing the required concentrations of allylsalicylaldehyde or other alkenylsalicylaldehyde and the diaminoalkane. The reaction generally is effected in the presence of an organic solvent. Any suitable solvent may be employed including, for example, benzene, toluene, xylene, cumene, decalin, etc., alcohols such as methanol, ethanol, propanol, butanol, etc., and ethers such as diethyl ether, diisopropyl ether, etc. Following the reaction, water, solvent and any unreacted constituents are removed in any suitable manner as, for example, by distilling at a temperature of from about 200° F. to about 350° F., preferably under vacuum in order to avoid decomposition of the reaction product. In another method, the condensation may be effected in a zone provided with a water outlet so that the water formed during the reaction is continuously removed from the reaction zone. The solvent later is removed in either the same or different zone.

From the above description it will be noted that the metal deactivator is prepared by the condensation of 2 moles of alkenylsalicylaldehyde and one mole of diaminoalkane. This condensation involves the liberation of 2 moles of water per mole of diaminoalkane and thus completion of the reaction is readily determined by measuring the water liberated in the reaction.

As hereinbefore set forth, an important advantage to the novel metal deactivator of the present invention is that it remains in solution at very low temperatures, in addition to the facts that it is a very effective metal deactivator and is of greater solubility. However, in most cases, the low temperatures encountered in the normal use of the metal deactivator are somewhat higher so that such a low freezing point is not required. Therefore, in another embodiment of the present invention, the metal deactivator herein set forth may be utilized in admixture with other metal deactivators having a higher freezing point. The mixed compositions will have a lower freezing point than the added metal deactivator alone, and the freezing point of the mixture may be sufficiently low to satisfy normal requirements. While the different metal deactivator compounds may be separately prepared and subsequently mixed, a preferred method of this embodiment is to simultaneously condense the alkenylsalicylaldehyde and salicylaldehyde, ortho vanillin and/or other suitable aromatic aldehydes with the diaminoalkane in proportions of 2 moles of total aromatic aldehyde per 1 mole of diaminoalkane. In this embodiment the alkenylsalicylaldehyde comprises from about 20 to about 90 mole percent of the total aromatic aldehyde used in the condensation. It will be seen that this condensation forms a mixture of different compounds. For example, when simultaneously condensing alkenylsalicylaldehyde and salicylaldehyde, the products include N,N'-di-(3-alkenylsalicylidene)-diaminoalkane, N,N'-di-(salicylidene)-diaminoalkane and N-(3-alkenylsalicylidene)-N'-salicylidene-diaminoalkane. As hereinbefore set forth, this mixture has a lower freezing point than the corresponding disalicylidene diaminoalkane and will remain in solution at the lower temperatures normally encountered during the use of the metal deactivator.

For ease in handling and in use, the metal deactivator normally is prepared as a solution in a suitable solvent. Preferred solvents include benzene, toluene, xylene, cumene, decalin, etc., as well as alcohols, ethers, etc. For economical reasons it is desirable to form as concentrated a solution of the active component of the metal deactivator as possible and, as hereinbefore set forth, the lower freezing point active component of the present invention permits the preparation and use of more concentrated solutions than otherwise is obtainable with other metal deactivators.

The metal deactivator normally is utilized along with other additives to be incorporated in the substrate for various reasons. For example, when used in gasoline, an antioxidant also is employed. In some cases the antioxidant is prepared as a solution in a suitable solvent and, when desired, the metal deactivator of the present invention may be commingled with the antioxidant and marketed as a mixed solution. Commercial gasoline antioxidants include N,N'-di-sec-butyl-p-phenylene diamine, N-n-butyl-p-aminophenol, 2,6-di-tert-butyl-4-methylphenol, etc. Similarly, when utilized in fatty materials, the metal deactivator may be prepared as a mixed solution with antioxidant or other additive to be incorporated in the fatty material. Commercial antioxidants for fatty materials include butylated hydroxyanisole, 2,6-di-tert-butyl-4-methylphenol, etc., and generally are used along with other materials including propyl gallate, citric acid, etc.

The metal deactivator is used in a small but sufficient concentration to prevent oxidation catalyzed by metal constituents. In general, the metal deactivator is used in a concentration of from about 0.0001% to about 0.5% by weight (based on active constituent) of the substrate. The antioxidant may be employed in a concentration of from about 0.001% to about 1% by weight of the substrate.

The metal deactivator is incorporated in the substrate in any suitable manner and, as hereinbefore set forth, the metal deactivator remains fluid at low temperatures and therefore is readily pumped for incorporating in the substrate. Intimate mixing of the metal deactivator in the substrate is accomplished in any suitable manner as, for example, pumping through orifice mixers, mixing in a tank equipped with stirrers, etc.

The following examples are introduced to illustrate further the novelty and utility of the present invention but not with the intention of unduly limiting the same.

*Example I*

The metal deactivator of this example was prepared by the condensation of 2 mole proportions of 3-allylsalicylaldehyde and 1 mole proportion of 1,2-diaminopropane. The allylsalicylaldehyde was prepared by condensing salicylaldehyde with allyl chloride in the presence of ethanol as a solvent. The reactants were refluxed at a temperature of 150–178° F. for about 2 hours to form the allyl ether of salicylaldehyde, which then was rearranged to form 3-allylsalicylaldehyde by refluxing at a temperature of 390–460° F. for about 2 hours.

48.05 grams of 3-allylsalicylaldehyde were admixed with 11.1 grams of 1,2-diaminopropane and 70 cc. of benzene. The mixture was refluxed for about 4 hours in a reaction zone equipped with a water leg which permitted the continuous removal of water formed during the reaction. 5 cc. of water was liberated in the reaction and this corresponds to the theoretical amount of water for the condensation of 0.3 mole of allylsalicylaldehyde with 0.15 mole of 1,2-diaminopropane. The reaction product was cooled and then distilled to a pot temperature of 140° C. under 17 mm. pressure to remove the last traces of benzene. The residue was N,N'-di-(3-allylsalicylidene)-1,2-diaminopropane and was a pale yellow, semi-viscous liquid having a refractive index, $n_D^{20}$, of about 1.5970 and a density, $d_4^{20}$, of 1.077.

The metal deactivator prepared in the above manner was evaluated in a Pennsylvania cracked gasoline which had a normal induction period of 60 minutes. Upon the addition of 0.01% by weight of N,N'-di-sec-butyl-p-phenylenediamine antioxidant, the induction period of the gasoline was increased to 860 minutes. However, upon the addition of 1 mg. of copper per liter to another sample of the gasoline containing the antioxidant, the induction period fell to about 60 minutes. The metal deactivator prepared as above was incorporated, in a concentration of 1.5 times the stoichiometric concentration required to chelate the copper, in another sample of the gasoline containing both the copper and antioxidant, and the induction period of the gasoline was increased to 780 minutes. It will be noted that the metal deactivator of the present invention served to offset the deleterious effect of the copper.

Example II

The metal deactivator of this example was prepared by the condensation of 2 moles of 3-methallylsalicylaldehyde and 1 mole of 1,2-diaminopropane. The methallylsalicylaldehyde was prepared in substantially the same manner as described in Example I for the preparation of allylsalicylaldehyde except that methallyl chloride was used instead of allyl chloride. 49.95 grams of methallylsalicylaldehyde, 10.5 grams of 1,2-diaminopropane and 100 cc. of benzene were admixed and refluxed for about 4 hours in a reaction vessel having a water leg for the continuous removal of water formed during the reaction. 5 cc. of water was recovered which corresponds to the theoretical amount of water for the condensation of 0.28 mole of 3-methallylsalicylaldehyde with 0.14 mole of 1,2-diaminopropane. The benzene solvent was removed by heating to 150° C. under 20 mm. pressure. The product was N,N'-di-(3-methallylsalicylidene)-1,2-diaminopropane and was a pale yellow, semi-viscous liquid having a refractive index, $n_D^{20}$, of about 1.5890 and a density, $d_4^{20}$, of 1.057.

The metal deactivator prepared in the above manner was utilized in another sample of the gasoline described in Example I. 1.5 times the stoichiometric amount of the metal deactivator required to chelate the copper was incorporated in another sample of the gasoline containing antioxidant and copper. The induction period of this sample was 885 minutes. In the absence of the metal deactivator but in the presence of copper and antioxidant, the induction period fell to about 60 minutes. It will be noted that the metal deactivator served to completely restore the induction period of the gasoline and to offset the deleterious effect of the copper.

Example III

The metal deactivator of Example I is used in a lard having a normal stability period of 4 hours as determined by the Active Oxidation Method. This method is a standard test for determining the stability of lard. In general, this test comprises bubbling air through a sample of the lard and periodically determining the peroxide number. The results are reported as the number of hours required to reach a peroxide number of 20.

In order to determine the effect of metal, a 3" strap of 18 gauge copper wire is added to a sample of the lard. This reduces the stability of the lard from 4 hours to 1 hour. However, upon the addition of 0.01% by weight of the metal deactivator of Example I, the stability of the lard is increased to the original value of 4 hours.

Similarly, the addition of 0.02% by weight of butylated hydroxyanisole antioxidant to another sample of the lard not containing copper increase the stability period of the lard to about 33 hours. However, upon the addition of copper to the lard containing butylated hydroxyanisole, the stability period drops to 2 hours. The metal deactivator of the present invention, when incorporated in a sample of the lard containing copper anad antioxidant, serves to increase the stability period of the lard.

Example IV

As hereinbefore set forth the metal deactivator of the present invention will not solidify at low temperatures. A series of solutions of the metal deactivators of Examples I and II were prepared in 50, 66.7 and 80% by weight concentrations in toluene and also in xylene. All of these solutions were cooled to about 3-4° F. The solutions remained homogeneous without any signs of hazing or precipitation of solids. Furthermore, these solutions remained homogeneous without precipitations of solids even when seeded.

In contrast to the above, a metal deactivator prepared by the condensation of 2 moles of salicylaldehyde with 1 mole of 1,2-diaminopropane, when prepared as solutions containing 50% and 66.7% by weight in xylene, precipitated out of solution when cooled to 3-4° F.

Example V

This example reports freezing point data of a number of different mixed condensation products. These condensation products were made by condensing a total of 2 mole proportions aromatic aldehyde having different proportions of salicylaldehyde and of allylsalicylaldehyde with 1 mole proportion of 1,2-diaminopropane. These are identified in the following table:

| Metal deactivator | Mole percent salicylaldehyde | Mole percent allylsalicla-ldehyde |
| --- | --- | --- |
| A | 90 | 10 |
| B | 80 | 20 |
| C | 75 | 25 |
| D | 66.7 | 33.3 |
| E | 60 | 40 |
| F | 50 | 50 |

These condensations were effected in substantially the same manner as hereinbefore described.

From each of the mixed condensation products prepared in the above manner were prepared 80% solutions in toluene, in 90% toluene–10% methanol, and in xylene solevnts. All of these were cooled to 3-4° F. In order to accelerate precipitation, if precipitation is to occur, all the compositions were seeded.

Composition A underwent precipitation when cooled to 3-4° F. Composition B became hazy and was on the threshhold of precipitation. It will be noted from the previous example that a metal deactivator prepared by the condensation of salicylaldehyde and 1,2-diaminopropane also precipitated out of solution when cooled to 3-4° F. All of the other compositions (C through F) remained liquid when cooled to 3-4° F. Therefore, in preparing mixed condensation products, allylsalicylaldehyde should be used in a concentration greater than about 20 mole precent and preferably from about 25 to about 80 mole percent of the total aromatic aldehyde used in the condensation.

I claim as my invention:

1. An organic substance containing a metal which normally catalyzes oxidative deterioration and additionally containing a metal deactivating amount of N,N'-di-(3-alkenylsalicylidene)-diaminoalkane.

2. An organic substance containing a metal which normally catalyzes oxidative deterioration and additionally containing a metal deactivating amount of N,N'-di-(3-allylsalicylidene)-1,2-diaminopropane.

3. Gasoline containing a metal which normally catalyzes oxidative deterioration and additionally containing a metal deactivating amount of N,N'-di-(3-alkenyl-salicylidene)-diaminoalkane.

4. Gasoline containing a metal which normally catalyzes oxidative deterioration and additionally containing a metal deactivating amount of N,N'-di-(3-allyl-salicylidene)-1,2-diaminopropane.

5. Gasoline containing a metal which normally catalyzes oxidative deterioration and additionally containing a metal deactivating amount of a mixture of N,N'-di-(3-allylsalicylidene)-1,2 - diaminopropane, N - (3 - allyl-salicylidene)-N'-(salicylidene)-1,2 - diaminopropane and N,N'-di-(salicylidene)-1,2-diaminopropane, said mixture being the condensation product of 1 mole proportion of 1,2-diaminopropane with 2 mole proportions of a mixture of salicylaldehyde wtih from about 20 to about 90 mole percent of allylsalicylaldehyde.

6. Fatty material containing a metal which normally catalyzes oxidative deterioration and containing a metal deactivating amount of N,N'-di-(3-alkenyl-salicylidene)-diaminoalkane.

7. Lard containing a metal which normally catalyzes oxidative deterioration and additionally containing N,N'-di-(3-allylsalicylidene)-1,2-diaminopropane in sufficient amount to deactivate said metal.

References Cited in the file of this patent

UNITED STATES PATENTS

| | | |
|---|---|---|
| 2,129,615 | Calvert | Sept. 6, 1938 |
| 2,181,122 | Downing | Nov. 28, 1939 |
| 2,317,757 | Graf | Apr. 27, 1943 |
| 2,405,886 | Hardman | Aug. 13, 1946 |
| 2,582,128 | Hurwitz | Jan. 8, 1952 |
| 2,583,729 | Deanesly | Jan. 29, 1952 |
| 2,656,259 | Smith et al. | Oct. 20, 1953 |
| 2,754,216 | Chenicek | July 10, 1956 |
| 2,789,912 | Gleim | Apr. 23, 1957 |
| 2,798,798 | Marsh et al. | July 9, 1957 |
| 2,813,080 | Bartlett | Nov. 12, 1957 |